(12) United States Patent
O'Reilly et al.

(10) Patent No.: US 9,253,272 B2
(45) Date of Patent: Feb. 2, 2016

(54) RELIABLE DELIVERY OF A PUSH-STATE AWARE CLIENT DEVICE

(75) Inventors: Jacob Samuel O'Reilly, Fredericton (CA); Michael LeBlanc, Fredericton (CA)

(73) Assignee: BlackBerry Limited, Waterloo, CA (US)

( * ) Notice: Subject to any disclaimer, the term of this patent is extended or adjusted under 35 U.S.C. 154(b) by 715 days.

(21) Appl. No.: 12/956,095

(22) Filed: Nov. 30, 2010

(65) Prior Publication Data

US 2011/0131297 A1 Jun. 2, 2011

Related U.S. Application Data

(60) Provisional application No. 61/265,928, filed on Dec. 2, 2009.

(51) Int. Cl.
| | |
|---|---|
| G06F 15/16 | (2006.01) |
| H04L 29/08 | (2006.01) |
| G06F 17/30 | (2006.01) |
| H04L 29/14 | (2006.01) |
| H04L 29/06 | (2006.01) |

(52) U.S. Cl.
CPC .......... *H04L 67/26* (2013.01); *G06F 17/30864* (2013.01); *H04L 69/40* (2013.01); *H04L 63/123* (2013.01); *H04L 67/1014* (2013.01)

(58) Field of Classification Search
CPC ... H04L 69/40; H04L 63/123; H04L 67/1014; H04L 67/26
USPC ........................................................ 709/219
See application file for complete search history.

(56) References Cited

U.S. PATENT DOCUMENTS

| | | | |
|---|---|---|---|
| 6,748,450 B1 | 6/2004 | Dutta | |
| 6,996,393 B2 * | 2/2006 | Pyhalammi et al. | ....... 455/412.1 |
| 7,058,691 B1 | 6/2006 | Yu et al. | |
| 7,254,614 B2 | 8/2007 | Mulligan et al. | |
| 7,284,035 B2 | 10/2007 | Yu et al. | |

(Continued)

FOREIGN PATENT DOCUMENTS

| | | |
|---|---|---|
| CA | 2393900 A1 | 1/2003 |
| CA | 2582064 A1 | 11/2007 |

(Continued)

OTHER PUBLICATIONS

Written Opinion of the International Searching Authority issued by the Canadian Intellectual Property Office dated Mar. 7, 2011 for corresponding International Patent Application No. PCT/CA2010/001905.

(Continued)

*Primary Examiner* — John Breene
*Assistant Examiner* — Eyob Hagos
(74) *Attorney, Agent, or Firm* — Moffat & Co.

(57) ABSTRACT

There are provided methods, systems, devices and computer program products for reliable delivery of content packages to a client device. Push delivery of content packages is combined with pull delivery when a push delivery fails. When a client device participates in a push delivery but fails to complete, a recommendation for corrective action may be notified and, following such corrective action, the client device pulls delivery. Respective content listings are maintained by server and client device for reconciliation to prompt pull delivery by the client device.

20 Claims, 8 Drawing Sheets

(56) References Cited

U.S. PATENT DOCUMENTS

| | | | |
|---|---|---|---|
| 7,457,304 B2 | 11/2008 | Roh et al. | |
| 7,673,007 B2 | 3/2010 | Mulligan et al. | |
| 7,730,199 B2 | 6/2010 | Song et al. | |
| 2003/0101271 A1* | 5/2003 | Smith et al. | 709/229 |
| 2004/0008688 A1* | 1/2004 | Matsubara et al. | 370/395.21 |
| 2004/0039791 A1* | 2/2004 | Watanabe | 709/217 |
| 2004/0199665 A1* | 10/2004 | Omar et al. | 709/238 |
| 2005/0083929 A1* | 4/2005 | Salo et al. | 370/389 |
| 2005/0203991 A1* | 9/2005 | Kawamura et al. | 709/203 |
| 2007/0208829 A1* | 9/2007 | Kim et al. | 709/219 |
| 2007/0239609 A1* | 10/2007 | Fish et al. | 705/51 |
| 2007/0260674 A1 | 11/2007 | Shenfield | |
| 2008/0059631 A1* | 3/2008 | Bergstrom et al. | 709/224 |
| 2008/0109533 A1* | 5/2008 | Taoyama et al. | 709/219 |
| 2008/0261632 A1* | 10/2008 | Hind et al. | 455/466 |
| 2008/0279562 A1* | 11/2008 | Naoe et al. | 398/140 |
| 2009/0260004 A1* | 10/2009 | Datta et al. | 717/175 |
| 2010/0100590 A1* | 4/2010 | Palay et al. | 709/203 |
| 2010/0192175 A1* | 7/2010 | Bachet et al. | 725/31 |

FOREIGN PATENT DOCUMENTS

| | | | |
|---|---|---|---|
| CA | 2710036 A1 | 7/2009 | |
| CA | 2713395 A1 | 8/2009 | |
| EP | 2077524 A2 | 7/2009 | |
| WO | 2008098835 A1 | 8/2008 | |
| WO | 2008134880 A1 | 11/2008 | |
| WO | 2009079794 A1 | 7/2009 | |
| WO | 2009097042 A1 | 8/2009 | |
| WO | 2009100539 A1 | 8/2009 | |

OTHER PUBLICATIONS

International Search Report issued by the Canadian Intellectual Property Office dated Mar. 7, 2011 for corresponding International Patent Application No. PCT/CA2010/001905.

Canadian Office Action dated Nov. 27, 2012, for corresponding Canadian Patent Application No. 2,782,462 filed Nov. 30, 2010.

Extended European Search Report dated Sep. 9, 2013, issued by the European Patent Office for corresponding European Patent Application No. 10834119.9.

Canadian Office Action dated Dec. 17, 2013, issued by the Canadian Intellectual Property Office for corresponding Canadian Patent Application No. 2,782,462.

Canadian Intellectual Property Office, Office Action, Application No. 12956095, Jan. 23, 2015.

International Preliminary Report on Patentability dated Mar. 8, 2012 issued by the Canadian Intellectual Property Office relating to International Application No. PCT/CA2010/001905.

* cited by examiner

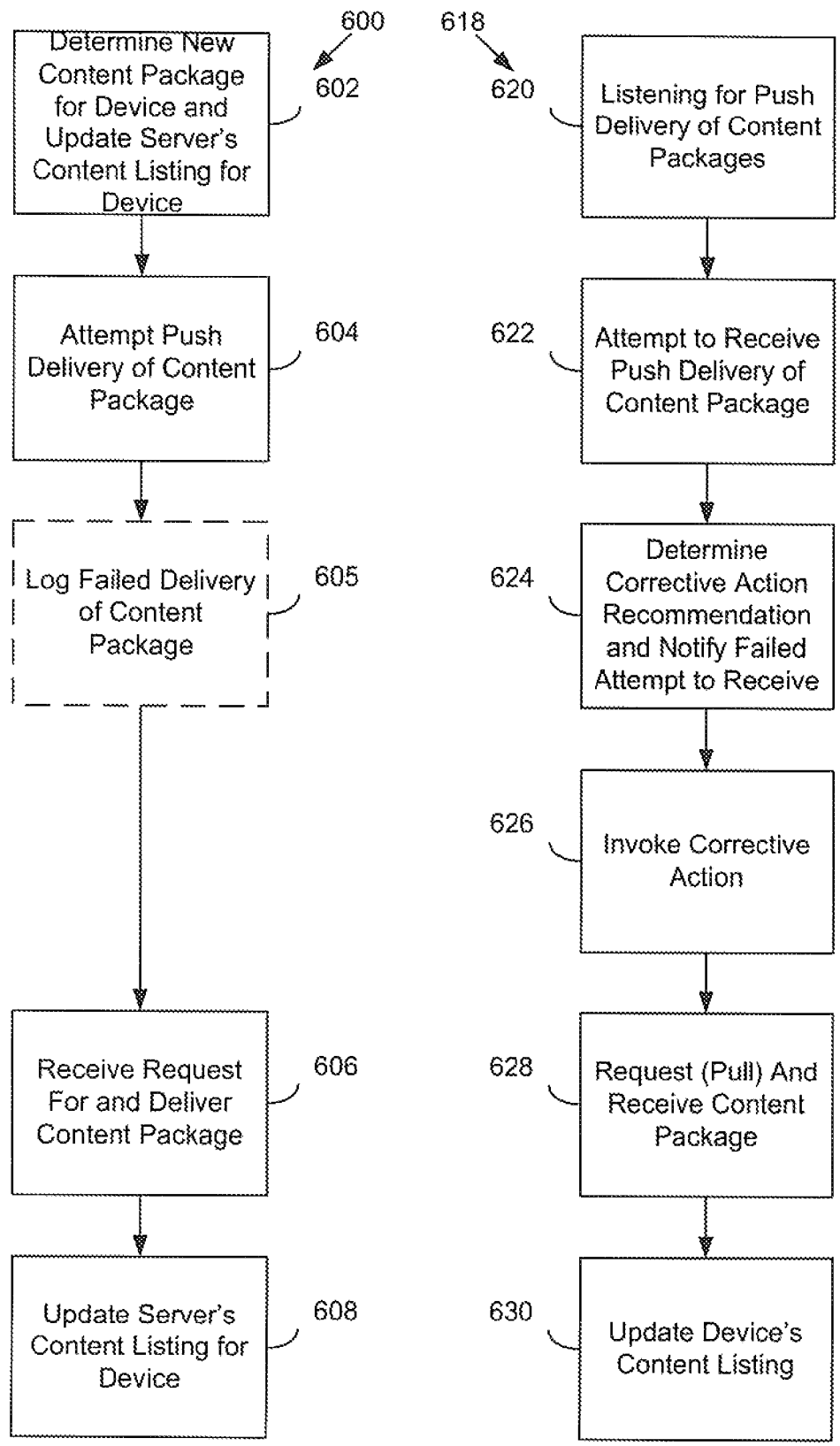

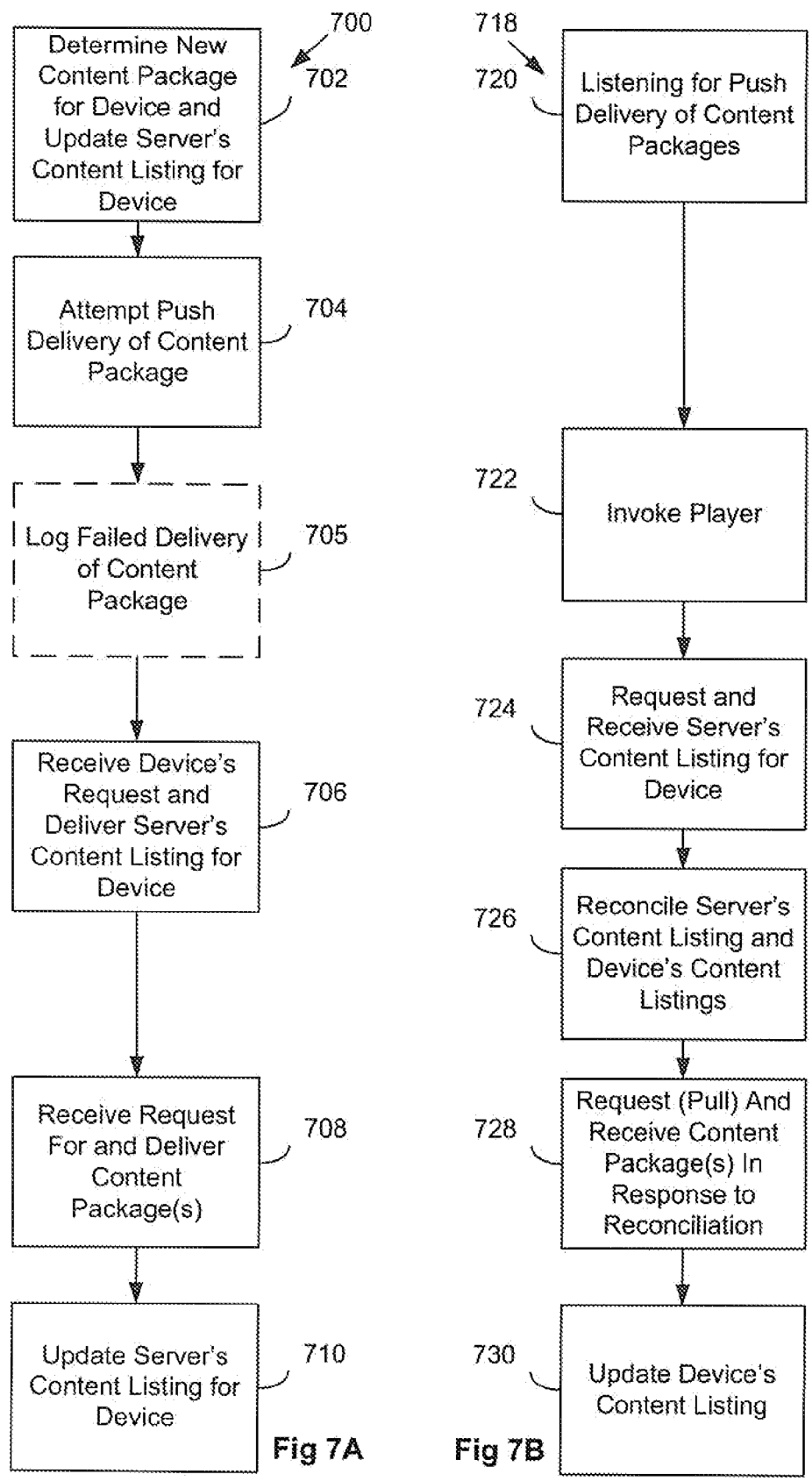

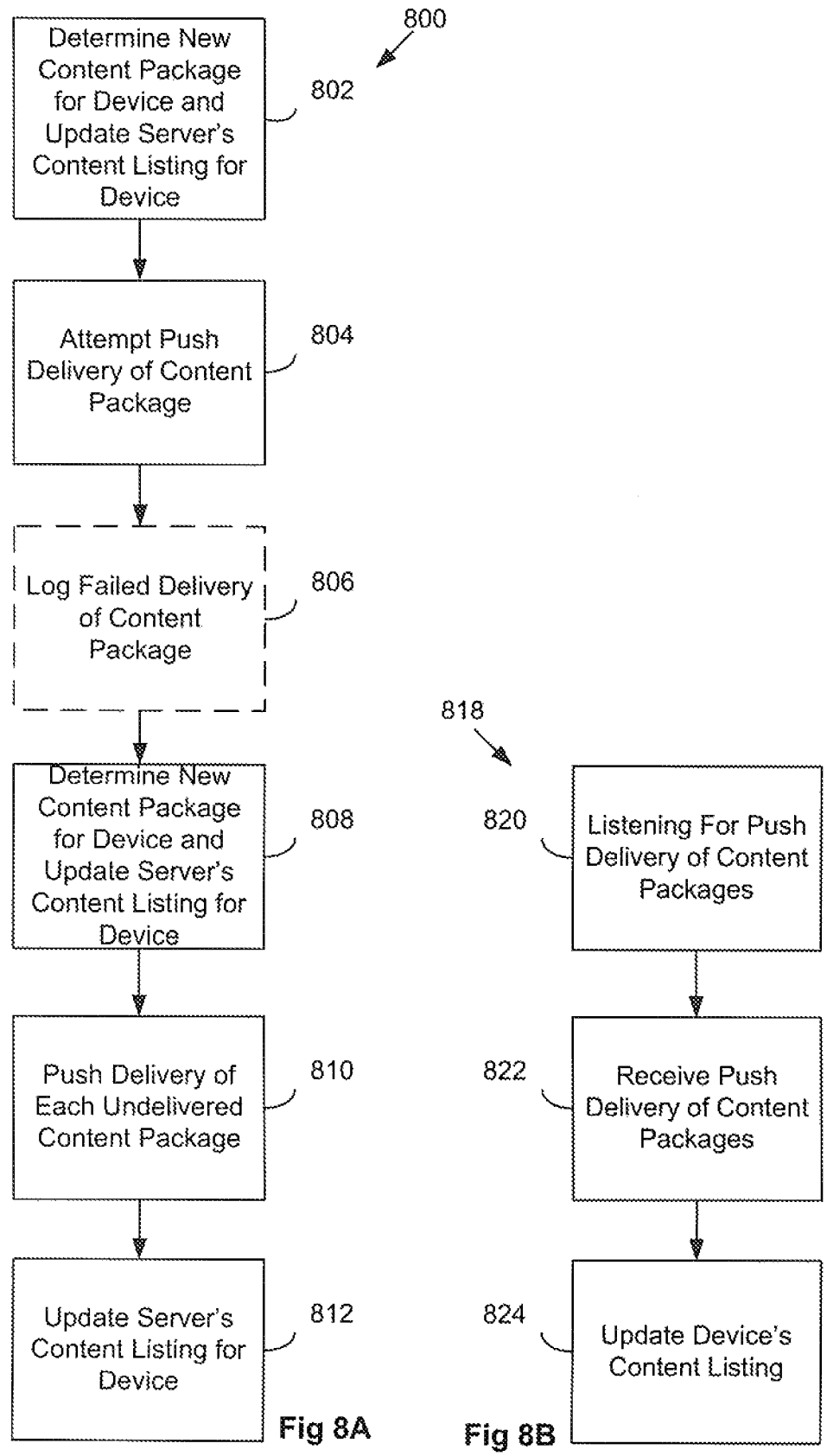

US 9,253,272 B2

RELIABLE DELIVERY OF A PUSH-STATE AWARE CLIENT DEVICE

CROSS REFERENCE

This application claims the benefit of U.S. Provisional Application No. 61/265,928 filed Dec. 2, 2009 and incorporated herein by reference.

FIELD

The present disclosure relates generally to communication of content to a client device and particularly to its reliable delivery.

BACKGROUND

Communication devices, particularly wireless communication devices are useful to receive and present content (e.g. information in one or more files) to users of such devices. Components of a content delivery system such as a content server and a client device may be configured to automatically communicate new content to a user. The content may be packaged and delivered from a content server for presentation by an application (e.g. a player) on such a client device. Occasionally, delivery of such content from server to client may fail to complete.

BRIEF DESCRIPTION OF THE DRAWINGS

The disclosure will now be described by way of example only with reference to the following drawings in which:

FIGS. 5A, 5B, 6A, 6B, 7A, 7B, 8A, and 8B are flow charts showing operations of a content server and a client device of the system of FIG. 4.

DETAILED DESCRIPTION

Figure 1:
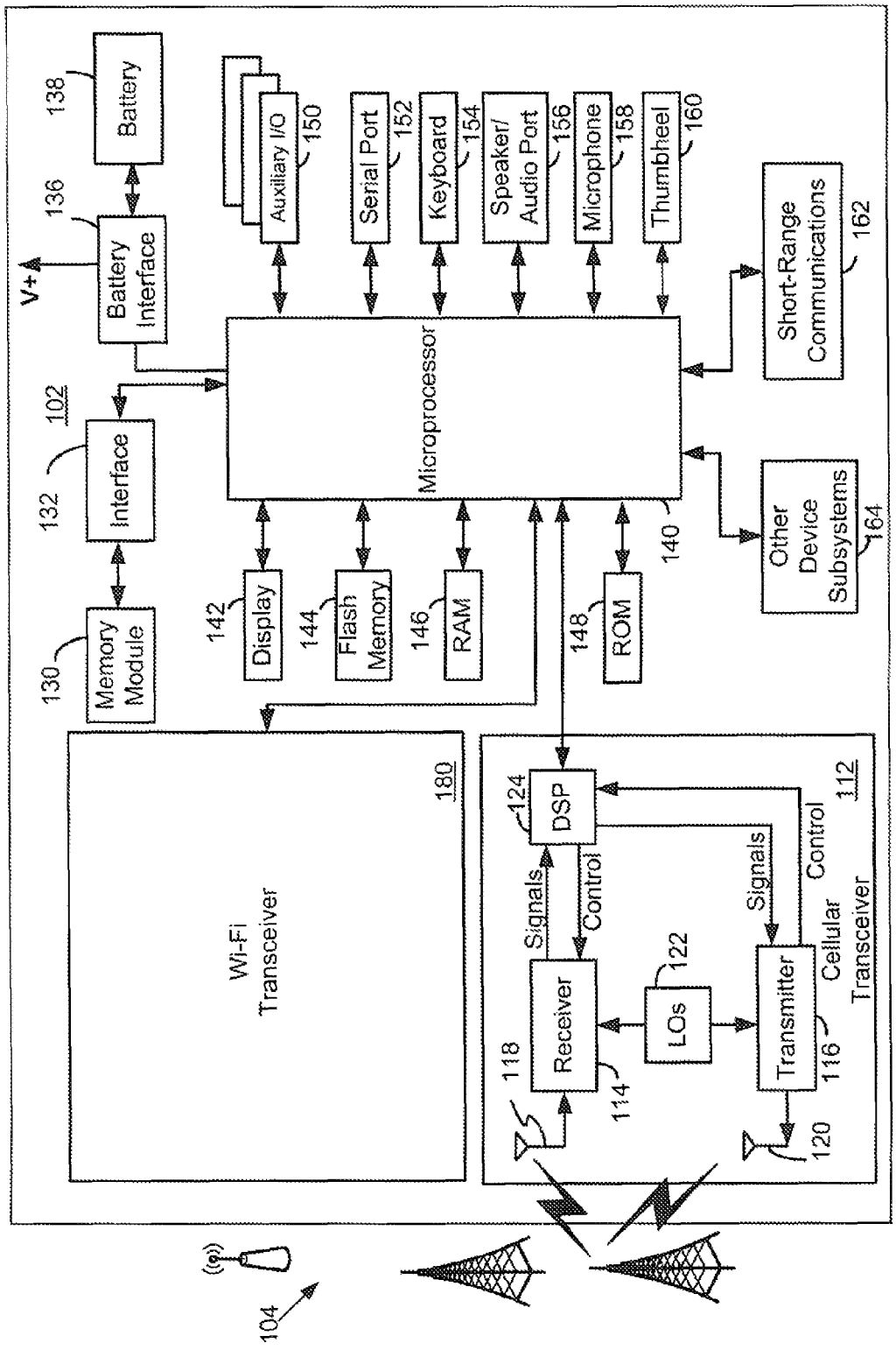
FIG. 1 is a block diagram illustrating a wireless device suitable for receiving content in accordance with one embodiment.

There are provided methods, systems, devices and computer program products for reliable delivery of content packages to a client device. Push delivery of content packages is combined with pull delivery when a push delivery fails. When a client device participates in a push delivery but fails to complete, a recommendation for corrective action may be notified and, following such corrective action, the client device pulls delivery. Respective content listings are maintained by server and client device for reconciliation to prompt pull delivery by the client device.

In accordance with one aspect there is provided a method for reliable delivery of content packages to a client device. The method comprises: listening for push delivery of at least one content package from a content server; maintaining a content listing of content packages received at the client device; and requesting pull delivery of at least one content package from the content server following a failed attempt at push delivery to the client device. The step of requesting may be initiated whether or not said client device attempted but failed to receive said push delivery.

In one feature, the method may comprise: attempting to receive a push delivery of a particular content package and failing to complete receiving the push delivery at the client device; determining a recommendation for a corrective action; and notifying of said failing for prompting said corrective action. Accordingly, the method may further comprise invoking the corrective action to facilitate requesting delivery of said particular content package. The method may further comprise prompting said requesting delivery following the invoking of said corrective action.

In one feature, the step of requesting delivery may be performed in response to a reconciliation of the content listing maintained by the client device and a second content listing for the device as maintained by the content server thereby to synchronize the content packages at the client device to the second content listing. Accordingly, the method may comprising: requesting and receiving the second content listing; and reconciling said listings. Reconciling may be automatically invoked in response to the invoking of execution of a player for playing the content packages at the client device.

The step of maintaining may comprise updating the content listing in response to a completed delivery of a content package by push delivery or pull delivery.

In accordance with another aspect, there is provided a communication device comprising a processor and a memory coupled thereto and a communication sub-system, coupled to the processor, for communicating with a content server to receive content packages, the memory storing instructions and data for execution by the processor to configure the communication device as a client device and to perform the method for reliable delivery of content packages in accordance with any the method aspect for such devices. Similarly, in another aspect there is provided a computer program product comprising a memory storing instructions and data to configure a processor of a communication device to perform such method.

In a further method aspect, there is a method for reliable delivery of content packages from a content server. The method comprises: identifying a particular content package for delivery via push delivery to a particular client device; attempting to deliver said content package via push delivery; maintaining data for content packages assigned for the particular client device, said data for generating a server's content listing for reconciling with a device's content listing maintained by the particular client device; receiving a request for pull delivery of at least one content package which failed to be received by the client device via push delivery; and delivering at least one content package via pull delivery.

The method may comprise receiving a request from the particular device to deliver the server's content listing for reconciling with the device's content listing; and delivering said server's content listing to facilitate the client device to generate said request for pull delivery. The step of maintaining may comprise updating the content listing in response to a completed delivery of a content package by push delivery or pull delivery.

There is provided a computer system comprising a processor and a memory coupled thereto and a communication sub-system, coupled to the processor, for communicating with at least one client device to deliver respective content packages to respective client devices. The memory stores instructions and data for execution by the processor to configure the computer system as a content server and to perform the method for reliable delivery of content packages in accordance with the second method aspect. A computer program product aspect may also be provided.

There is also provided a communications system for reliably delivery of content packages comprising: a computer system configured as a content server as described and at least one communication device each configured as a client device as described. These and other aspects will be apparent to persons of ordinary skill from the description and figures herein.

Reference is first made to FIG. 1, which shows a block diagram illustrating a portable wireless device 102 that is suitable for receiving content in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a one or more communication subsystems 112, 180. Communication subsystem 112 comprises a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access (WAN) may be associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems. Device 102 may include a Wi-Fi transceiver 180 that may comprise similar components/chipsets to subsystem 211 adapted for one or more Wi-Fi protocols. Though Wi-Fi is shown, WiMAX is one alternative transceiver. In some embodiments, device 102 may be capable of both Wi-Fi and WiMAX communications in accordance with software-defined radio ("cognizant radio") techniques.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
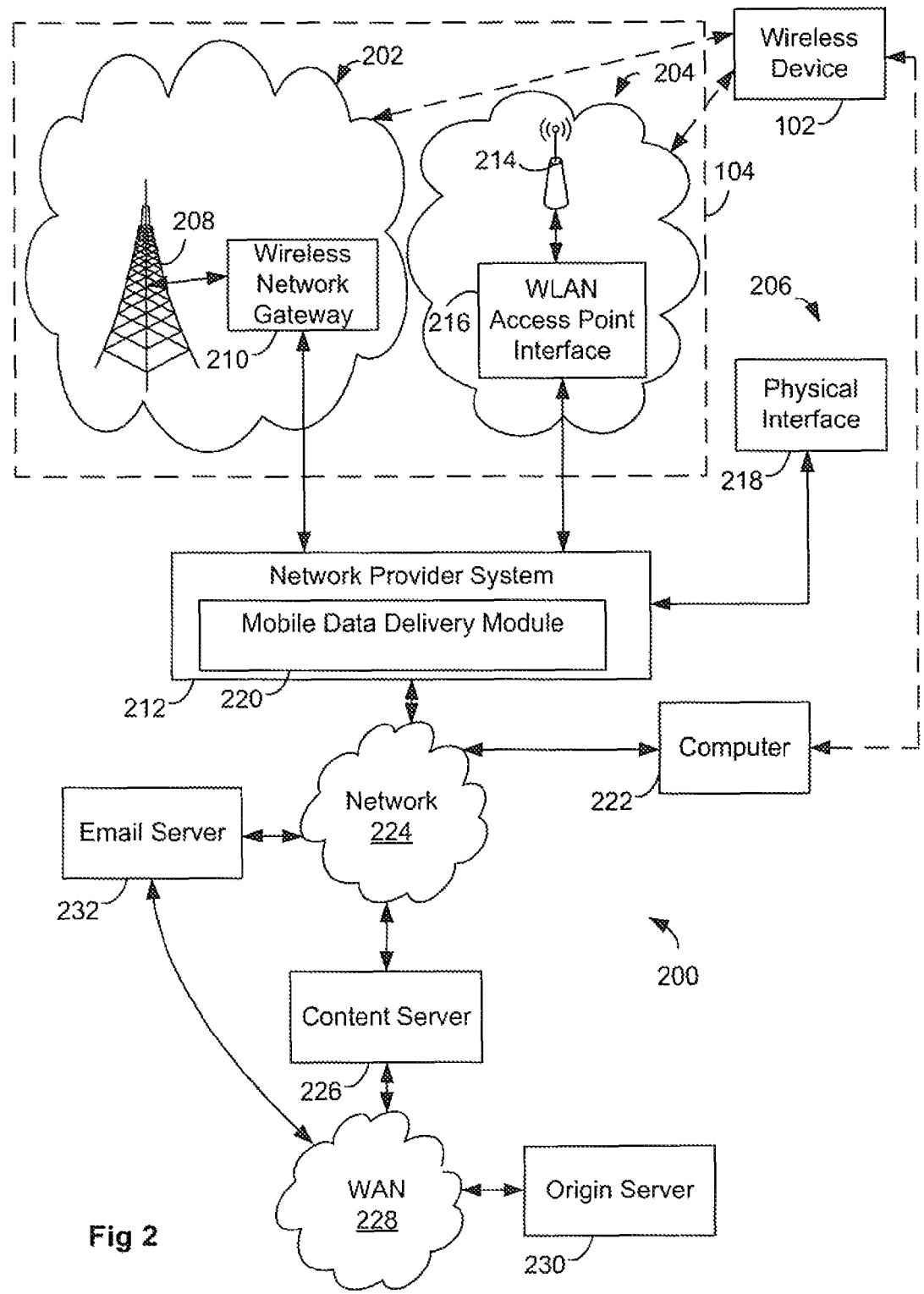
FIG. 2 is a block diagram of a communication system suitable for providing the operating environment of the device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
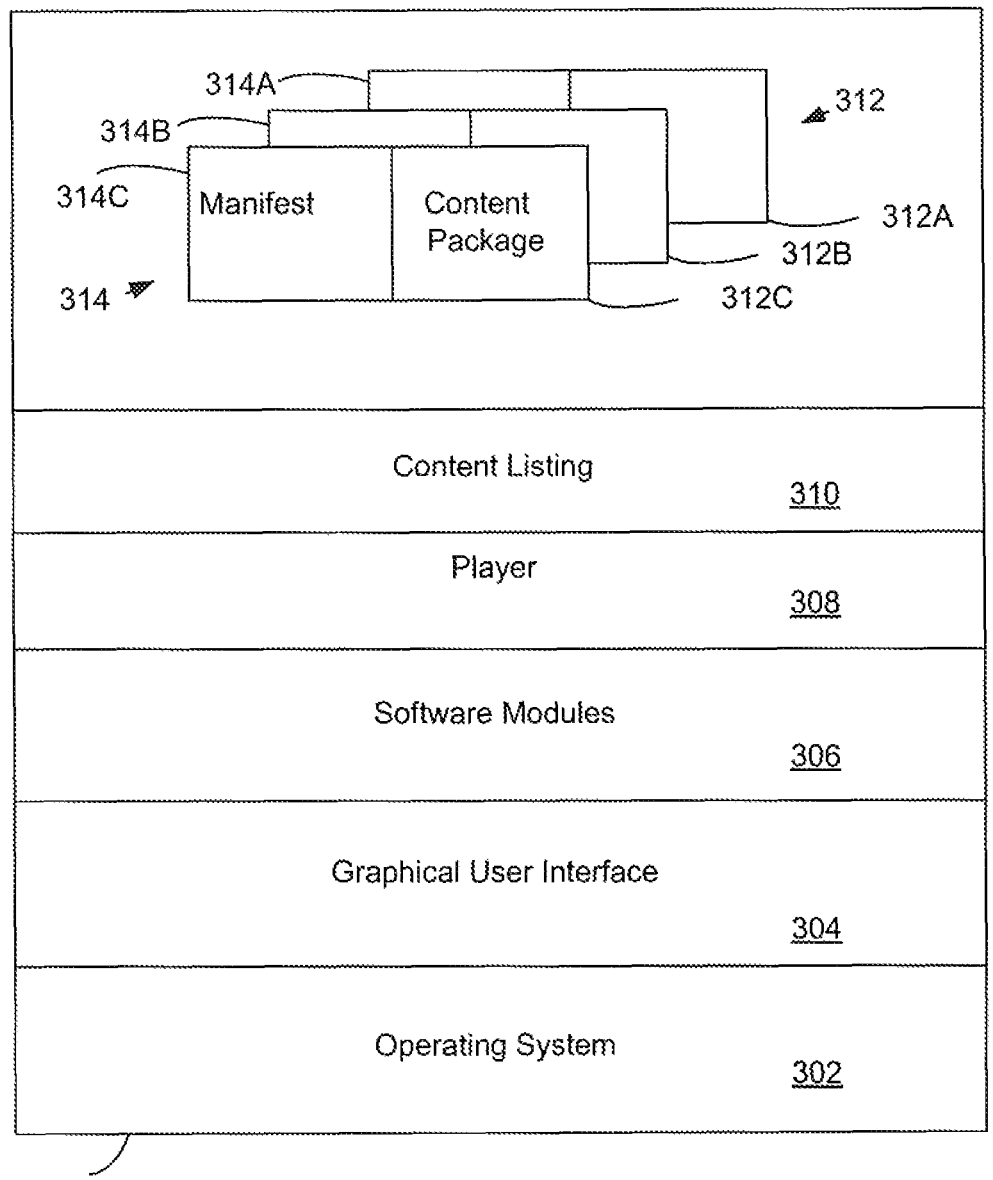
FIG. 3 illustrates selected modules of a memory of a wireless device of FIG. 1 in accordance with one embodiment.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content player 308, which may also be referred to as a content delivery module. In one example, the mobile content player 308 may be integrated into the operating system 302. Alternatively, the module 308 may be a separate software component, as illustrated in FIG. 3. The mobile content player 308 may be responsible for managing content delivery from the perspective of the wireless device 102 and/or playing the content, which may include interactive components, on the wireless device 102. Memory 300 further comprises a content listing 310 for the device 102 and one or more respective content packages 312A-312C, collectively 312 and respective manifests 314A-314C, collectively 314 describing the content of the content packages (e.g. URLs for retrieval of the component content of a package as further described below), received from content server 226. Operation of the mobile content player 308 will be described in more detail below, in connection with FIG. 4.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

The term "push" or "push delivery" is used herein to refer to a method of content delivery to a client device, such as a mobile wireless communication device describe above, that is automatically delivered by a content server upon the server's initiation and without any action being required on the part of a user of a wireless device 102. In brief, the content server initiates the delivery of the content to the waiting client device which is listening on a predetermined communication channel for notification of new content. It is contrasted with "pull delivery" whereby the client device periodically sends inquiries (i.e. polls) to the content server whether new content is available.

Figure 4:
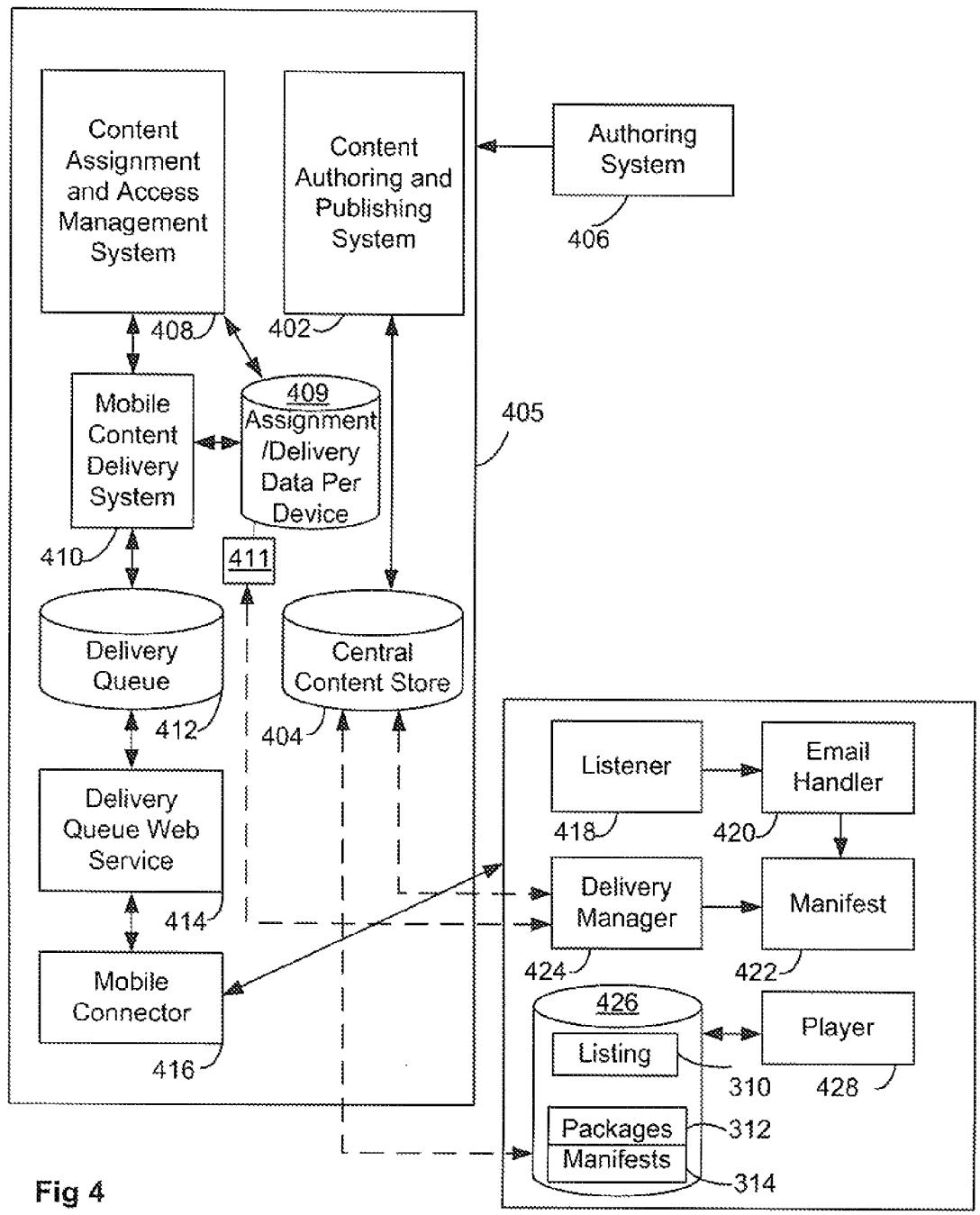
FIG. 4 shows in block diagram form the communication system of FIG. 2 and the device of FIG. 1 configured to provide content to the wireless device in accordance with one embodiment.

Reference is next made to FIG. 4, which shows in simplified block diagram form an content delivery system comprising an authoring system 406, the communications system of FIG. 2 and the wireless device of FIG. 1, represented as a system 400, configured to deliver content to the wireless device 102 in accordance with one embodiment. The system 400 generally includes an authoring system 406, a content server 405 and the wireless device 102.

The authoring system 406, allows a user to open an existing content file or create a new content file. In some embodiments, the authoring system may be integrated into an application for document creation such as a presentation authoring application, such as, for example, Microsoft™ PowerPoint™, using an add-in application. In such embodiments, when the add-in is installed, a separate menu item can appear in the application's menus that provides the user with options for authoring, publishing and delivering the content. In some embodiments, content may be created in an application such as a slideshow or presentation application add-in and sent to the content authoring and publishing system 402 as described in PCT patent application no. PCT/CA2008/002275 entitled "A Method and System for Authoring Mobile Content in a Slideshow or Presentation Application for Direct Delivery to a Mobile Device", which is hereby incorporated by reference in its entirety.

The authoring system 406 may allow interactive components to be included in the content, such as clickable activities, radio boxes, text boxes or the like. An interactive component will generally have one or more associated attributes. In some embodiments, the attributes can include the location of an activation area and possibly one or more commands to be executed when the activation area is selected by a user. For example, the interactive component may be a clickable activity where the activation area is activated when the user 'clicks' on the activation area. For example, the activation area may include a telephone number and clicking on the activation area may execute commands to initiate a telephone call or an SMS message to be sent to the number indicated. If the activation area includes an email address, clicking on the activation area could allow the user to compose an email to be sent to that address. As another example, the activation area could include a Universal Resource Locator (URL) which invokes a web browser when the area is activated by the user. Further examples could include launching a video or audio player or mapping coordinates or addresses. Where interactive components have been included in the content, the authoring system may determine the location of an activation area of an interactive component and provide this information along with any other attributes, such as associated commands, to the content server 405.

The content server 405 generally comprises a content authoring and publishing system 402, a central storage 404, a content assignment and access management system 408, a mobile content delivery system 410, a delivery queue 412, a delivery queue web service 414 and a mobile connector 416.

The content authoring and publishing system 402 may be used to format, publish and/or centrally store in the central storage 404 new content received from the authoring system 406. The content authoring and publishing system 402 may be implemented, for example, using a number of systems in the market today, which provide for creation and central storage of content formatted for wireless devices. Alternatively, the content authoring and publishing system 402 may be implemented using solutions yet to be developed.

The content authoring and publishing system 402 may receive content files from the authoring system 406. The content authoring and publishing system 402 may also include a reformatting component for formatting content for use by the wireless device 102. Content may, in one example, be described as one or more media types that when combined create a content package. This package may include, for example, text, images, video, and/or audio. The content package may also include information about embedded interactive components including the associated attributes. The content package may be stored in the central content storage 404 for later access. Authoring of some of the content may be accomplished by a different application and then saved to the central storage 404. For example, an audio clip may be authored in an audio editing tool, saved, and then published to a central content server, such as central storage 404. In some embodiments, another system (not shown) may manage access to this content.

The content package may be assigned to users for use (i.e. delivery to such user's devices). This may be initiated, for example, by the author of the content through the authoring system 406. This assignment may function as a trigger for the delivery to occur. In one example, the content assignment and access management system 408 may make a request to the mobile content delivery system 410 to send all the content directly to a user's wireless device 102 after the user has accepted an invitation to add the content server 405. This request may contain information identifying what type the content is (e.g., a mobile learning course) and target user information so the delivery can be directed to specific wireless devices 102 belonging to specific individual users. The request may also contain information that the content server 405 uses to find all elements of the content to be delivered. The content assignment may not need any knowledge of the mobile transport platform being used, which may be configured in the mobile connector 416 and may be tied to a user's wireless device 102 type. The content assignment and access management system 408 may maintain a store (e.g. database) reflecting the published content, the users and the assignment of specific content packages to specific users. A server content listing may be generated, on demand, for providing to a client device, for reconciling content packages that have been assigned to the client device (e.g. user) and actual content packages received at the device.

If the content publisher wishes to send an invitation to a specific user to opt in to the content server 405 then the invitation to that user may be created by the content assignment and access management system 408. This invitation may be created and sent to the mobile content delivery system 410 for delivery to the wireless device 102 of the selected user.

In another embodiment (not shown), user's may subscribe (i.e. register) to receive new content via a subscription system such as an application or content store where content publishers and content are advertised (e.g. listed in a catalog or other form of offering). A user may select one or more publishers from which the user desires to receive new content as it is published and becomes available. The user may select content that is previously published. Registration with the store and/or one or more publishers may be required to identify the user and/or the user's device and mode of communication for receiving new content. Such subscriptions may be free or pay-based services, such as described in U.S. Provisional Patent Application No. 61/265,924 entitled "System and Method for Centrally Distributing Mobile Content", filed Dec. 2, 2009, which is hereby incorporated by reference in its entirety (now U.S. application Ser. No. 12/948,084 filed Nov. 17, 2010). Such user subscriptions/registrations may be registered with mobile content delivery server 405 (e.g. system 408 thereof) to enable delivery of new content as further described.

The mobile content delivery system 410 may receive requests to deliver new content. When these requests are received, the mobile content delivery system 410 may look up the target and determine if the user has a wireless device 102 and if that device has a transport defined. The request may be verified to be in the proper format and then processed. If the user does not have a wireless device 102 or a transport has not been defined, then the appropriate response is returned to the requesting system. Every user may register with the mobile content delivery system 410 to ensure the deliveries can take place. Once this information is gathered, the mobile content delivery system 410 may place the request onto the delivery queue 412 with a status indicated as "new". In one example, the request may be an XML request. As described briefly herein above, content assignment and access management system 408 and/or mobile content delivery system 410 may maintain data 409 per each client device 102 to monitor which content packages have been assigned to a particular client device 102 and may further monitor whether such content was delivered to such device 102. The data may be useful to generate and define content listings 411 for particularly devices, as needed, for example, in response to a device's request for reconciling to the device's local content listing 310. The server's content listing for a device may facilitate reconciliation with the content listing 310 maintained by the device 102 as described below.

Each XML request may be populated with a company identifier that determines which company is authorized to view the XML request on the delivery queue 412. Modifications to the content may occur after the content has been delivered. It may be left to the calling application to send a new delivery request for the content if it has changed.

The delivery queue web service 414 may listen for requests made by the mobile connector 416. These requests may determine if there are items on the queue 412 that the mobile connector 416 is able to extract and deliver. Delivery queue web service 414 may also provide the server's content listing for a device in response to a request from mobile connector 416.

The mobile connector 416 may poll the delivery queue web service 414 in predefined intervals to see if there is any content available that needs to be delivered. The mobile connector 416 may issue a web services call to the delivery queue web service 414. This call may contain user credentials that the web service 414 authenticates to determine what queue items the mobile connector 416 is authorized to see. If there are no items authorized, the mobile connector 416 may wait for a predefined time interval to elapse and try again. If the mobile connector 416 does find an item on the queue, the mobile connector 416 may retrieve the queued item as, for example an XML document that describes the content. The mobile connector 416 may only process one queued item at a time, but may alternatively be configured to process multiple items at a time.

When the mobile connector 416 receives an XML transaction from the web service 414, the mobile connector 416 looks up the intended transport for the wireless device 102 type and delivers to the wireless device 102. The mobile connector 416 may further return result codes back to the delivery queue web service 414 based on the ability of the mobile connector 416 to successfully send the delivery request to the wireless device 102 infrastructure. Such codes may be useful for the web service 414 and/or mobile content delivery system 410 to update and thereby maintain listings 411.

The mobile connector 416 may work simultaneously with several mobile platforms or transport types. This may include any transport that allows a real-time delivery of content to the wireless device 102, or any mechanism that publishes the content directly to the wireless devices 102 wirelessly.

The wireless device 102 generally includes a listener 418, an email handler 420, a manifest 422, a delivery manager 424, local storage 426 and a mobile content player 428.

The listener 418 may listen for the request sent (in accordance with push delivery) from the mobile connector 416. The request can comprise a manifest file 422 (e.g. an XML manifest) including a content URL for each component of the content package. The listener 418 may receive the manifest 422 and extract each content URL. The listener 418 may then send each content URL to the delivery manager 424 for retrieval form the central storage 404 using the content URLs. Manifest 422 may be stored to local storage 426 (e.g. manifests 314).

If a request is received via e-mail, the wireless device 102 processes the e-mail through the email handler 420. The email handler 420 decrypts the contents of the email, if encrypted, that contain the instructions for retrieving the manifest 422, reads the e-mail information into memory, and then deletes the e-mail from the user's wireless device 102 email inbox. The email handler 420 uses the information stored in memory to make an HTTP request to the content server 405 requesting the manifest 422. When the content server 405 determines that a user's e-mail and PIN are valid, it sends the manifest to the mobile device 102 through its HTTP response.

The delivery manager 424 may process a manifest file 422 by retrieving each item specified by URL in the manifest file 422 from the central content storage 404. These items may be placed in the wireless device local device storage 426. Once content is delivered to the wireless device 102, the content remains in the local storage 426 for the mobile content player 428 to render it. The delivered content package may be removed from the player 428 (local storage 426) or from the mobile content delivery system 412. Occasionally aged data, such as manifests, content packages or portions thereof on the device 102 are removed to make resources available for new data. Occasionally, a user will delete a content package and its manifest that is no longer desired. If the player 428 attempts to render content that has been removed from the local storage 426, then the player 428 may automatically attempt to retrieve the content (manifest and content package or missing portion thereof) from the content server 405. A user may permanently remove data from local storage 426 for example, when the user no longer desires access to it, for the purpose of un-assigning the content package to the user. Similarly, at the level of server 405 (e.g. via content assignment and access management system 408) a content package previously assigned to a user/device 102 may be unassigned. Though not shown in delivery and reconciliation operations described further below, client device 102 and server 405 may be configured to reconcile the un-assignments of content packages to maintain their respective content listings. In one embodiment, a content package that is un-assigned at the server level may, (e.g. when the respective content listings are synchronized), invoke the deletion of the content package and manifest from local store 426. Content un-assigned at the device level may, in one embodiment, cause the content to be un-assigned at the server level.

The mobile content player 428 may be programmed to render various content types on the mobile device. The mobile content player 428 may also be programmed to render the interactive components, for example, by rendering an activation area on the visual representation of the content based on a location attribute determined previously and received as part of the content package. The mobile content player 428 may be programmed to detect when an activation area has been selected (e.g. clicked on) by a user of the wireless device and to execute any associated commands.

One aspect of the present application may make use of caching servers (not shown) for content delivery to the wireless devices 102. When a delivery occurs, the content may be retrieved from a local caching server instead of the centralized content server 405.

While the content server 405 and authoring system 406 are represented as distinct components and have a number of sub-components, any of these components or subcomponents may be implemented as modules running on a number of interconnected servers or on a single server, depending on the design criteria of a particular application. For example, any of the components 402, 404, 406, 408, 410, 412, 414, and 416 may be implemented on any of the network provider system 212, the network 224, the content server 226, the email server 232, or the origin server 230. Alternatively, in one example, the components 402, 404, 406, 408, 410, 412, 414, and 416 may be implemented on a single one of the network provider system 212, the network 224, the content server 226, the email server 232, or the origin server 230.

Occasionally content (e.g. a manifest, content package or portion thereof) sent via push delivery to the client device 102 is not successfully received. In some instances, the client attempts to receive the push delivery but fails to complete the delivery. For example, it may not be possible to store the content package (i.e. one or more of its components) to a storage device of the client device, at least temporarily. In one scenario, content packages may be for storing to a SD Card or other local storage medium. The client device may be coupled for communication with another device via serial port 152 and be configured in a Mass Storage Mode enabling storage to the SD Card by the other coupled device but not by the client device itself. If a content package is attempted to be push delivered at this time, it cannot be stored at the client device until Mass Storage Mode is terminated. Client device 102 may be configured to identify the failed attempt and recommend corrective action to remediate. Other failures may include network coverage or connectivity failures causing timeouts during an attempt to receive and store content, other local storage resource limitations, e.g. full storage, insufficient storage, storage failure. Such errors may be determined and notified with corrective actions.

As content packages are typically push delivered in a transparent, background fashion not requiring user intervention, client device 102 (e.g. via delivery manager 424 and/or player 428) may be configured to notify a user of the failure to receive a content package by push delivery. The notification may comprise a signal to a user such as the association of a warning with the player. The warning may comprise a change to the player's icon for invoking operation (e.g. an exclamation mark, asterisk or other symbol). Other notifications may be used.

Invocation of the player in response to the notification (i.e. following such notification) may invoke a prompt explaining the failure and providing the corrective action. Corrective action may be invoked such as in response to user input to configure the device 102. The user may be prompted whether to invoke a request to receive the content package and a request sent to the content server 405 (e.g. via mobile connect 416) to deliver the content package. In another embodiment, the request may be automatically invoked, for example, in response to the corrective action.

In some scenarios, client device 102 will fail to receive a push delivery and not participate in an attempt at push delivery thereby not determining that a failure has occurred. To enhance delivery reliability, content server 405 may be configured to push deliver the content package which failed to be delivered the next time another content package is to be push delivered, for example, using the server's content listing and determining that a content package remains undelivered.

The client device may be configured, such as upon next invocation of the player, to reconcile the content listing 310 with the server's content listing 411 for the device and request delivery of content packages that failed to be push delivered. Operations of content server 405 and mobile device 102 are further described with reference to FIGS. 5A-5B, 6A-6B, 7A-7B and 8A-8B.

Figures 5A, 5B:
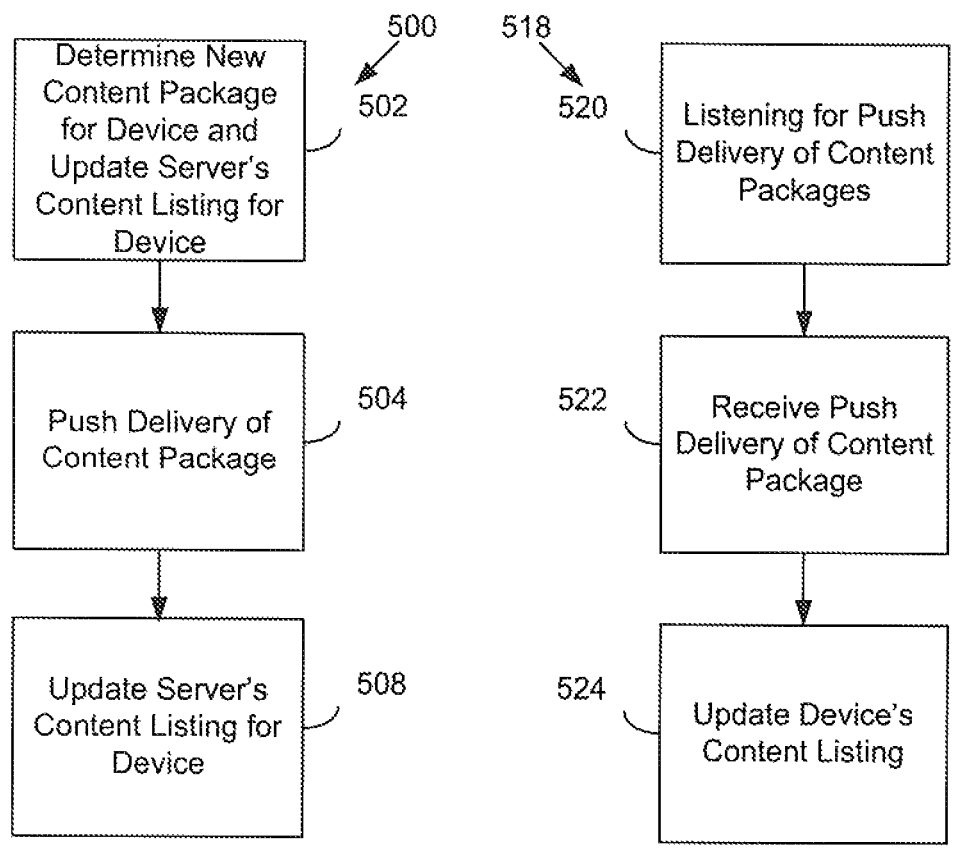

With reference to FIGS. 5A-5B, there is shown flow charts of operations 500 and 518 of server 405 and device 102 respectively, for delivering content packages in accordance with one embodiment. In this embodiment, a content package is delivered successfully using push delivery. At block 502, server 505 determines that a new content package is available for a particular device. The content listing 411 is updated for the device. The content listing may comprise an identification of the specific content package that is intended for the device 102. In one embodiment, the content listing may also include a delivery status (e.g. pending or delivered).

At block 504, the content package is push delivered, for example as described above with reference to FIG. 4. At block 508, the server's content listing 411 is updated for the device, indicating a delivered content package.

With reference to corresponding operations 518 of device 102, at block 520, the device 102 is listening for push delivery of content packages from server 405. At block 522, the content package is received via push delivery, for example, as described below. The device may receive a manifest 422 and pull respective content identified in the manifest for local storage to storage 426. At block 524, the device's content listing 30 is updated to reflect the received content package.

With reference to FIGS. 6A-6B, there is shown flow charts of operations 600 and 618 of server 405 and device 102 respectively, for delivering content packages in accordance with one embodiment. In this embodiment, a content package is delivered successfully via pull delivery after failing a push delivery. At block 602, server 405 determines that a new content package is available for a particular device. The content listing 411 is updated for the device. The content listing may comprise an identification of the specific content package that is intended for the device 102. In one embodiment, the content listing may also include a delivery status (e.g. pending or delivered). At step 604, an attempt to push deliver the content package is made. It is unsuccessful. Optionally, at step 605, the failed attempt is logged. At step 606, which may be some time later, server 405 receives a request for and delivers the content package to the client device 102 via pull delivery. That is, as the device initiates the transfer, it pulls the content package possibly including the manifest from the server 405. At block 608, the server updates its respective content listing 411.

Operations 618 show device 102 listening for a push delivery of a content package at block 620. At block 622, an attempt to receive push delivery of a content package is made. It fails to complete, for example, because the device 102 is coupled via USB (serial port 156) to a laptop or other device (not shown) and is in a Mass Storage Mode. At block 624, a corrective action recommendation is determined and a notification of the failed attempt to receive is generated. In one embodiment, the notification may comprise a signal associated with the player 428 such as change to the icon for invoking the player. A pop up or other message may be utilized. For example, invocation of the player icon (not shown) may initiate correction operations whereby the user is prompted to take actions or confirm actions through various inputs. At bock 626, corrective action is invoked, for example, to turn off Mass Storage Mode or de-couple the serial connection.

At block 628, device 102 requests and receives (i.e. pulls) at least one content package from server 405. Device 102 may request the specific package(s) that failed to be push delivered and that it has data for or may make a general request for server 405 to delivery undelivered content packages. At block 630, device 102 updates (maintains) its local client listing 310. Though only one failed push delivery is shown at blocks 602-605, more than one attempt to push content packages may have occurred prior to steps 606-608.

With reference to FIGS. 7A-7B, there is shown flow charts of operations 700 and 718 of server 405 and device 102 respectively, for delivering content packages in accordance with one embodiment. In this embodiment, a content package is delivered successfully via pull delivery following a reconciliation of content listings, after failing a push delivery. At block 702, server 405 determines that a new content package is available for a particular device. The content listing 411 is updated for the device. The content listing may comprise an identification of the specific content package that is intended for the device 102. In one embodiment, the content listing may also include a delivery status (e.g. pending or delivered). At step 704, an attempt to push deliver the content package is made. It is unsuccessful. Optionally, at step 705, the failed attempt is logged.

At step 706, which may be some time later, server 405 receives a request for and delivers the server's content listing for the device to device 102.

At step 708, server 405 receives a request for and delivers at least one content package to device 102 via pull delivery. That is, as the device initiates the transfer, it pulls the content package possibly including the manifest from the server 405. At block 710, the server updates its respective content listing 411 indicating the content package or packages are delivered. Though only one failed push delivery is shown at blocks 702-705, more than one attempt to push content packages may have occurred prior to steps 706-710.

Operations 718 show device 102 listening for a push delivery of a content package at block 720. In this scenario, device 102 does not participate in the attempt of block 704 and is not aware that it has failed to receive a content package. At block 722, player 426 is invoked, e.g. in response to user input. At block 724, device (e.g. player 426) initiates a request to server 405 and receives the server's content listing for the device. At block 724, device 102 reconciles content listing 310 with received server's listing 411 for the device. At block 728, device 102 requests and receives (i.e. pulls) at least one content package from server 405. Device 102 may request the specific package that failed to be push delivered or may make a general request for server 405 to deliver undelivered content packages. At block 730, device 102 updates (maintains) its local client listing 310.

Operations 718 may be performed each time or periodically upon invocation of player 426. Operations 718 are simplified, showing the scenario where a push delivery was missed. It is understood that operations 718 may contemplate that following reconciliation at 726, if no content packages are determined to be pending delivery, operations 718 may terminate without requesting the pulling of a content package or further update to listing 310.

Though operations 500 show the push delivery of a single new content package, server 405 may be configured to push a previously undelivered content package (or packages), each time it attempts to push a new content package (see FIGS. 8A and 8B). Similarly, server 405 and device 102 may be configured that when device 102 pulls a content package, server 405 sends and device 102 receives more than one content package for which a prior push delivery has failed (not shown). Reference may be had to FIGS. 8A and 8B illustrating flow charts of representative operations 800 and 818 showing a first push delivery that failed and a second push delivery of each undelivered content package. Blocks 802, 804 and 806 represent a failed attempt to push deliver a content package and blocks 808, 810 and 812 represent the push delivery of the first and at least a second undelivered content package by server 405. Blocks 820, 822 and 824 represent the receiving of push delivery of these packages at device 102.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

What is claimed is:

1. A method for reliable delivery of content packages to a client device, the method comprising:
maintaining a device content listing of content packages received or to be received at the client device, the device content listing being for reconciling with a server content listing of content packages intended for delivery to the client device from a content server;
listening for push delivery of a manifest file specifying a content packages listed in the vice content listing;
upon receiving push delivery of the content package updating the device content listing to indicate that the content package has been received; and
upon determining, based upon reconciliation of the server content listing with the device content listing, a failed attempt at push delivery to the client device requesting pull delivery of the content package from the content server.

2. A method of claim 1 further comprising:
in response to a failed attempt to receive a particular content package or portion thereof, notifying the client device of said failed attempt; and
prompted b said notifying, determining a recommendation for a corrective action to remediate the client device.

3. The method of claim 2 further comprising invoking said corrective action to facilitate receiving delivery of said particular content package or portion thereof.

4. The method of claim 3 further comprising requesting delivery following the invoking of said corrective action.

5. The method of claim 1 wherein reconciliation is invoked in response to invoking execution of a player for playing said at least one content package at the client device.

6. The method of claim 1 wherein maintaining comprises updating the content listing in response to a completed delivery of a content package by push delivery or pull delivery.

7. A communication device comprising a processor and a memory coupled thereto and a communication sub-system, coupled to the processor, for communicating with a content server to receive content packages, said memory storing instructions and data for execution by the processor to configure the communication device as a client device and to:
maintain a device content listing of content packages received or to be received at the client device, the device content listing being for reconciling with a server content listing of content packages intended for delivery to the client device from a content server
listen for push delivery of a manifest file specifying a content package listed in the device content listing;
upon receiving push delivery of the content package update the device content listing to indicate that the content package has been received; and
upon determining, based upon reconciliation of the server content listing with the device content listing, a failed attempt at push delivery to the client device, request delivery of the content package from the content server.

8. The communication device of claim 7 further wherein the instructions and data further configure the execution of the communication device to invoke a corrective action to facilitate requesting delivery of said particular content package.

9. The communication device of claim 8 wherein the instructions and data further configure the execution of the communication device to prompt said the request for pull delivery following the invoking of a corrective action.

10. The communication device of claim 7 wherein said reconciliation is invoked in response to invoking execution of a player for playing said at least one content package at the client device.

11. The communication device of claim 7 wherein maintaining comprises updating the content listing in response to a completed delivery of a content package by push delivery or pull delivery.

12. A method for reliable delivery of content packages from a content server comprising:
maintaining a server content listing of content packages delivered or to be delivered to a particular client device;
identifying a particular content package for delivery via push delivery to a particular client device;
delivering a manifest file for the content package to the particular client device;
abandon delivery of the content package upon a failed attempt at push delivery of the content package to the client device;
after abandoning delivery of the content package, receiving a request from the particular device to deliver the server content listing; and
delivering said server content listing to the client device for use by the device to compare with a device content listing, whereby based upon the comparison, the client device generates a request for pull delivery of the content package.

13. The method of claim 12 comprising:
receiving the request for pull delivery of the content package which failed to be received by the client device via push delivery; and
delivering said content package via pull delivery.

14. The method of claim 12 wherein the maintaining comprises updating the server content listing in response to a completed delivery of a content package by push delivery or pull delivery.

15. A computer system comprising a processor and a memory coupled thereto and a communication sub-system, coupled to the processor, for communicating with at least one client device to deliver respective content packages to respective client devices, said memory storing instructions and data for execution by the processor to configure the computer system as a content server and to:
maintain a server content listing of content packages delivered or to be delivered to a particular client device;
identify a particular content package for delivery via push delivery to a particular client device;
deliver a manifest file for the content package to the particular client device;
abandon delivery of the content package upon a failed attempt at push delivery of the content package to the client device;
after abandoning delivery of the content package, receive a request from the particular device to deliver the server content listing; and
deliver said server content listing to the client device for use by the device to compare with a device content listing, whereby based upon the comparison, the client device generates a request for pull delivery of the content package.

16. A non-transitory computer program product comprising a memory storing instructions and data to configure a processor of a communication device to:
maintain a server content listing of content packages delivered or to be delivered to a particular client device;
identify a particular content package for delivery via push delivery to a particular client device;
deliver a manifest file for the content package to the particular client device;
abandon delivery of the content package upon a failed attempt at push delivery of the content package to the client device;
after abandoning delivery of the content package, receive a request from the particular device to deliver the server content listing; and
deliver said server content listing to the client device for use by the device to compare with a device content listing, whereby based upon the comparison, the client device generates a request for pull delivery of the content package.

17. The method of claim 2 wherein the corrective action comprises an action to correct one of a storage device access failure; storage full failure, storage insufficient failure, storage failure, a network coverage failure and a network connectivity failure.

18. The communication device of claim 8 wherein the corrective action comprises an action to correct one of a storage device access failure; storage full failure, storage insufficient failure, storage failure, a network coverage failure and a network connectivity failure.

19. The method of claim 1 wherein the requesting pull delivery is performed in response to a reconciliation of the device content listing maintained by the client device and the server content listing for the device as maintained by the content server thereby to synchronize the content packages at the client device to the server content listing.

20. The method of claim 19 further comprising:
requesting and receiving the server content listing; and
reconciling said device and server content listings.

* * * * *

UNITED STATES PATENT AND TRADEMARK OFFICE
CERTIFICATE OF CORRECTION

PATENT NO. : 9,253,272 B2  
APPLICATION NO. : 12/956095  
DATED : February 2, 2016  
INVENTOR(S) : Jacob Samuel O'Reilly and Michael LeBlanc Page 1 of 1

It is certified that error appears in the above-identified patent and that said Letters Patent is hereby corrected as shown below:

Claims:

Column 16, Line 49, In Claim 1, please delete "vice" and insert --device--.

Signed and Sealed this
Twenty-sixth Day of July, 2016

Michelle K. Lee
*Director of the United States Patent and Trademark Office*